Patented Feb. 18, 1941

2,232,659

UNITED STATES PATENT OFFICE 2,232,659

AMINO-HYDROXY ARSENO-BENZENE

Alfred Fehrle, Bad Soden, Taunus, and Walter Herrmann, Paul Fritzsche, and Hans Hilmer, Frankfort-on-the-Main-Hochst, Germany, assignors to Winthrop Chemical Company, Inc., New York, N. Y., a corporation of New York No Drawing. Application May 15, 1937, Serial No. 142,930. In Germany May 22, 1936

1 Claim. (Cl. 260—444)

In U. S. Patent No. 1,973,023 is described the conversion of amino-arsenobenzenes to hydroxyalkylamino-arsenobenzene-formaldehyde-bisulphite compounds by causing them to react with alkylene oxides and sodium formaldehyde-bisulphite.

The present invention relates to the manufacture of the same compounds by condensing a hydroxyalkylamino-benzene-arsonic acid with an aminobenzene-arsonic acid which may also contain a hydroxyalkyl residue to produce an unsymmetrical arsenobenzene derivative and introducing the formaldehyde-bisulphite residue into one of the amino-groups.

Instead of the arsonic acids there may be used the reduction products thereof, namely an arsine oxide or arsine dichloride and an arsine respectively.

The invention further relates to the manufacture of the same compounds by condensing molecular proportions of a symmetrical hydroxyalkylamino-arsenobenzene with a symmetrical amino-arsenobenzene which may also contain a hydroxyalkyl residue to the corresponding asymmetrical arsenobenzene and causing the latter to react with sodium formaldehyde-bisulphite. The manufacture may also start from a symmetrical amino-arsenobenzene-formaldehyde-bisulphite compound which is then condensed with a symmetrical hydroxyalkylaminoarsenobenzene. The products thus obtained correspond to the following general formula:

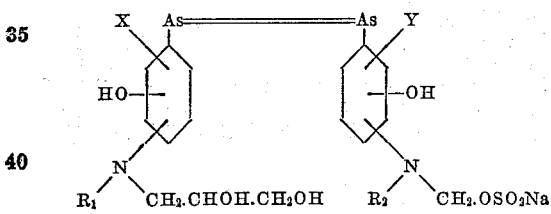

wherein $R_1$ stands for a member of the group consisting of —$CH_2.CHOH.CH_2OH$ and —$CH_2CH_2OH$, $R_2$ stands for a member of the group consisting of —H, —$CH_2.CHOH.CH_2OH$ and —$CH_2.CH_2OH$, X stands for —H or $CH_3.CO.NH$— and Y stands for —H or a hydroxyalkyl residue, for instance, a hydroxyethyl residue or a hydroxymethyl residue.

The products are yellow powders, soluble in water, insoluble in ether, acetone and benzene and effective against spirochaetes.

The following examples illustrate the invention:

1. 30.7 grams of 3-(dihydroxypropyl)-amino-4-hydroxybenzene-1-arsonic acid, 23.3 grams of 3-amino-4-hydroxybenzene-1-arsonic acid and 40 grams of potassium iodide are dissolved in 600 cc. of hydrochloric acid of 10 per cent. strength, the solution is decolourised by means of animal charcoal and 80 cc. of hypophosphorous acid of 50 per cent. strength are added. During this operation the temperature increases to about 36° C. When the solution is stirred into concentrated hydrochloric acid a yellow precipitate of the hydrochloride of 3-(dihydroxypropyl)-amino-4-hydroxy-3'-amino-4'-hydroxyarsenobenzene separates. The compound readily dissolves in water. Instead of hypophosphorous acid there may be used other reducing agents such as hydrosulphite. From the aqueous solution of 47.55 grams of the hydrochloride the base is precipitated by means of sodium carbonate, it is filtered with suction, suspended in water and heated with an aqueous solution of 12.8 grams of sodium formaldehyde-bisulphate at about 50° C. until the solution is clear. From this solution the yellow sodium 3-(dihydroxypropyl)-amino-4-hydroxy-3'-amino-4'-hydroxyarsenobenzene-formaldehyde-bisulphite of the following formula:

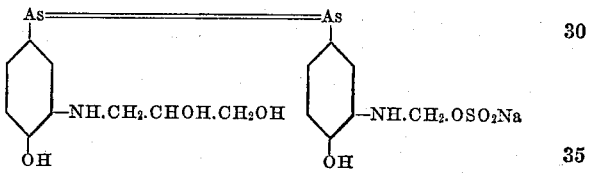

is precipitated by the addition of a mixture of ethyl alcohol and ether; the precipitate is filtered with suction and washed with ether. The product readily dissolves in water; its chemical and pharmacological properties are the same as those of the compound obtained as described in Example 2 of U. S. Patent No. 1,973,023. The 3-(dihydroxypropyl)-amino-4-hydroxybenzene-1-arsonic acid, used as parent material, is obtained by the action of 1 mol of glycide on 3-amino-4-hydroxybenzene-1-arsonic acid at a slightly raised temperature; it is a colourless powder which readily dissolves in sodium carbonate solution.

2. 35.1 grams of 3-(dihydroxypropyl-hydroxyethyl)-amino-4-hydroxybenzene-1-arsonic acid, prepared as described with reference to Example 3 of German Patent No. 618,447 and 23.3 grams of 3-hydroxy-4-aminobenzene-1-arsonic acid, obtainable as indicated in German Patent No. 244,166, are dissolved in hydrochloric acid and the solution is reduced in the manner described in Example 1 by means of hypophosphorous acid in the presence of potassium iodide to the hydrochloride of 3-(dihydroxypropyl-hydroxyethyl)-amino - 4-hydroxy-3'-hydroxy-4'-amino-arsenobenzene. The product readily dissolves in water. 52 grams of the hydrochloride are dissolved in aqueous methyl alcohol, 8 cc. of sodium bisulphite solution of 39 per cent. strength are added drop by drop and then 10 cc. of formaldehyde of 30 per cent. strength are added. After stirring for a short time there are added 10.4 cc. of the same sodium bisulphite solution and a solution of 13.9 grams of sodium sulphite in 42 cc. of water and the neutralised solution is precipitated in ethyl alcohol. During this operation the sodium 3-(dihydroxypropyl-hydroxyethyl)-amino-4-hydroxy-3' - hydroxy -4'-amino-arsenobenzene-formaldehyde-bisulphite of the following formula:

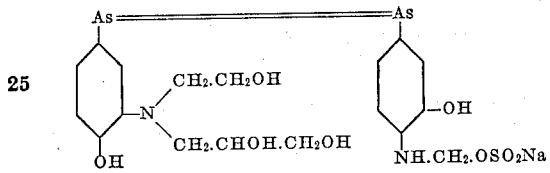

separates in the form of a yellow precipitate which is filtered by suction and washed with ether. The compound readily dissolves in water.

3. 38.1 grams of 3-(bis-dihydroxypropyl)-amino-4-hydroxybenzene-1-arsonic acid, prepared as indicated in Example 1 of German Patent No. 614,941, and 30.7 grams of 3-(dihydroxypropyl)-amino-4-hydroxybenzene-1-arsonic acid (see Example 1) are reduced in the manner described above to the hydrochloride of 3-(bis-dihydroxypropyl) - amino - 4 - hydroxy - 3' - (dihydroxypropyl) - amino - 4' - hydroxyarseno - benzene and then transformed by means of sodium formaldehyde-bisulphite into the sodium 3 - (bis - dihydroxypropyl) - amino - 4 - hydroxy- 3' - (dihydroxypropyl) - amino - 4' - hydroxyarsenobenzene - formaldehyde - bisulphite of the following formula:

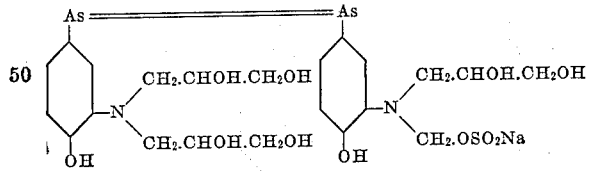

The dark yellow powder is readily soluble in water.

4. 35.1 grams of 3-hydroxy-4-(dihydroxypropyl - hydroxyethyl) - aminobenzene - 1 - arsonic acid, prepared by the action of 1 mol of ethylene oxide and 1 mol of glycide on the 3-hydroxy-4-aminobenzene-1-arsonic acid, prepared as indicated in German Patent No. 244,166, are dissolved in 60 cc. of water, the solution is decolourised by means of animal charcoal and an aqueous solution of 4.8 grams of potassium iodide is added. After a prolonged introduction of sulphurous acid the yellow liquid is stirred into a mixture of ethyl alcohol and ether. During this operation a precipitate of 3-hydroxy-4-(dihydroxypropyl)-aminobenzene-1-arsine oxide separates which is filtered by suction and washed with ether.

If 18.5 grams of 3-amino-4-hydroxybenzene-1-arsine prepared as indicated in U. S. Patent No. 1,026,094 are caused to act upon 31.7 grams of this arsine oxide in a hydrochloric acid solution, there is obtained with evolution of heat the hydrochloride of 3-hydroxy-4-(dihydroxypropyl-hydroxyethyl) - amino - 3' - amino-4'-hydroxyarsenobenzene which is precipitated by the addition of ethyl alcohol in the form of a yellow powder and transformed in the usual manner by means of sodium formaldehyde-bisulphite into the corresponding sodium 3-hydroxy-4-(dihydroxypropyl - hydroxyethyl) - amino-3'-amino-4. 35.1 grams of 3-hydroxy-4-(dihydroxysulphite of the following formula:

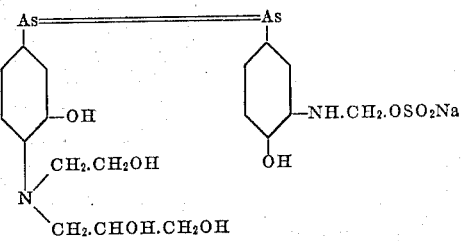

The dark yellow powder very readily dissolves in water.

5. 43.9 grams of the dihydrochloride of 3, 3'-diamino-4, 4'-dihydroxyarsenobenzene, prepared as indicated in U. S. Patent No. 986,148 and 58.7 grams of the dihydrochloride of 3, 3'-bis-(dihydroxypropyl) - amino - 4, 4' - dihydroxyarsenobenzene, prepared in a corresponding manner from 3-(dihydroxypropyl)-amino-4-hydroxybenzene-1-arsonic acid, are dissolved in 500 cc. of water and the solution is heated to about 80° C. By stirring ethyl alcohol into the solution the hydrochloride of 3-(dihydroxypropyl)-amino-4-hydroxy-3'-amino-4'-hydroxyarsenobenzene separates in the form of a yellow precipitate which is filtered by suction and transformed as described in Example 1 by means of sodium formaldehyde-bisulphite into the sodium 3-(dihydroxypropyl) - amino - 4 - hydroxy - 3' - amino - 4' - hydroxyarsenobenzene - formaldehyde - bisulphite there formulated. The products obtained by the different methods have the same chemical and pharmacological properties.

6. 42.45 grams of the dihydrochloride of 3, 3'-di-(bis-dihydroxypropyl)-amino-4, 4'-dihydroxy-5, 5'-di-(acetylamino)-arsenobenzene are dissolved in 250 cc. of water and after neutralisation with sodium carbonate the solution is heated for a short time at about 80° C. with a solution of 21.95 grams of sodium 3, 3'-dihydroxy-4, 4'-diamino - arsenobenzene - di - (formaldehyde - bisulphite) in 250 cc. of water. By stirring the clear liquid into a mixture of ethyl alcohol and ether the sodium 3 - (bis - dihydroxypropyl) - amino - 4 - hydroxy - 5 - acetylamino - 3' - hydroxy - 4' - aminoarsenobenzene - formaldehyde-bisulphite of the following formula:

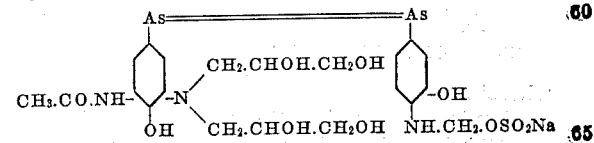

separates in the form of a dark yellow precipitate which is filtered with suction and washed with ether. The same compound is obtained if the corresponding arsonic acids are reduced by means of hypophosphorous acid and are caused to react with sodium formaldehyde-bisulphite. The 3 - (bis - dihydroxypropyl) - amino - 4 -hydroxy - 5 - acetylaminobenzene 1 arsonic acid necessary as starting material is obtained in the form of a colourless powder, which readily dissolves in water, by nitrating 4-hydroxy-5-acetylaminobenzene-1-arsonic acid to the 3-nitro-4-hydroxy-5-acetylaminobenzene-1-arsonic acid, reducing this to the 3-amino-4-hydroxy-5-acetylaminobenzene-1-arsonic acid and then causing 2 mols of glycide to act upon this compound.

If, furthermore, 3-hydroxy-4-aminobenzene-1-arsonic acid is reduced in known manner by means of hydrosulphite to the 3,3'-dihydroxy-4,4'-diamino-arsenobenzene which is then caused to react with sodium formaldehyde-bisulphite the sodium 3,3'-dihydroxy-4,4'-diamino-arsenobenzene-di-(formaldehyde-bisulphite) is obtained.

7. 33.75 grams of the dihydrochloride of 3,3'-dis-(dihydroxypropyl-hydroxyethyl)-amino-4,4'-dihydroxyarsenobenzene (see Example 2) and 24.95 grams of the dihydrochloride of 3,3'-diamino-4,4'-dihydroxy-5,5'-di-(methoxy)-arsenobezene, prepared in the usual manner from the acid obtainable as described in Example 1 of U. S. Patent No. 1,935,960, are condensed at a slightly raised temperature as described in the foregoing examples in an aqueous solution to the hydrochloride of 3-(dihydroxypropyl-hydroxyethyl)-amino - 4 - amino - 3' - amino - 4'-hydroxy-5'-methoxyarsenobenzene and transformed by means of sodium formaldehyde-bisulphite in an aqueous solution into the sodium 3-(dihydroxypropyl-hydroxyethyl)-amino-4-hydroxy-3'-amino-4'-hydroxy-5'-methoxy-arsenobenzene-formaldehyde-bisulphite of the following formula:

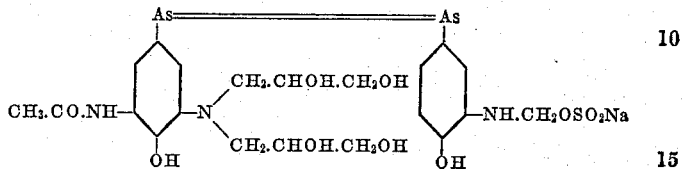

The yellow powder readily dissolves in water.

8. 42.45 grams of the dihydrochloride of 3,3'-di-(bis-dihydroxypropyl)-amino - 4,4' - dihydroxy-5,5'-di-(acetylamino)-arsenobezene are dissolved in 250 cc. of water and after neutralisation with sodium carbonate the solution is heated for a short time at about 80° C. with a solution of 29.90 grams of sodium 4,4'dihydroxy-3,3'-diaminoarsenobenzene-di-(formaldehyde - bisulphite) in 250 cc. of water. By stirring the clear liquid into a mixture of ethyl alcohol and ether the sodium 3-(bis-dihydroxypropyl)-amino-4-hydroxy-5-acetyl - amino-4'- hydroxy-3'- aminoarsenobenzene-formaldehyde-bisulphite of the following formula:

As=================As
CH₃.CO.NH—⟨ ⟩—N(CH₂.CHOH.CH₂OH)(CH₂.CHOH.CH₂OH)  ⟨ ⟩—NH.CH₂OSO₂Na
         OH                                              OH separates in the form of a dark yellow precipitate which is filtered with suction and washed with ether. The same compound is obtained if the corresponding arsonic acids are reduced by means of hypophosphorous acid and are caused to react with sodium formaldehyde-bisulphite. The 3-(bis-dihydroxypropyl)-amino-4-hydroxy-5-acetylamino-benzene-1-arsonic acid necessary as starting material is obtained in the form of a colorless powder which readily dissolves in water by nitrating 4-hydroxy-5-acetylaminobenzene-1-arsonic acid, reducing to the 3-amino-4-hydroxy-5-acetylaminobenzene-1-arsonic acid and then causing 2 mols of glycide to act upon this compound.

If, furthermore, 4-hydroxy-3-aminobenzene-1-arsonic acid is reduced in known manner by means of hydrosulphite to the 4,4'-dihydroxy-3,3'-diaminoarsenobenzene which is then caused to react with sodium formaldehyde-bisulphite the sodium 4,4'-dihydroxy-3,3'-diaminoarsenobenzene-di-(formaldehyde-bisulphite) is obtained.

We claim:
The product of the following formula:

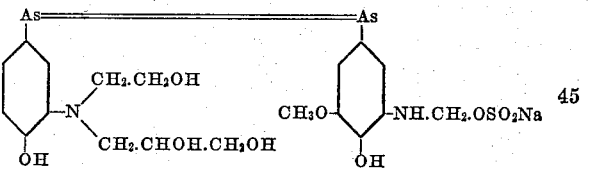

said product being a yellow powder, soluble in water, insoluble in ether, acetone and benzene and effective against spirochaetes.

ALFRED FEHRLE.
WALTER HERRMANN.
PAUL FRITZSCHE.
HANS HILMER.